UNITED STATES PATENT OFFICE 2,676,926

STABILIZER FOR PETROLEUM PRODUCTS

John O. Smith, Jr., North Plainfield, and Allen R. Jones, Roselle, N. J., assignors to Standard Oil Development Company, a corporation of Delaware No Drawing. Application July 3, 1950, Serial No. 172,008

21 Claims. (Cl. 252—47.5)

This invention relates to additives for use in stabilizing organic materials which are susceptible to oxidation and/or polymerization on contact with air or oxygen, and particularly for use in mineral lubricating oils and other petroleum hydrocarbon products.

It is well known in the art to utilize various addition agents in organic compositions in order to prevent the oxidation of the latter, which results in the production of undesirable degradation products such as peroxides, acidic materials, sludge, varnish-like deposits, and the like. This is particularly the case with respect to hydrocarbon products, both saturated and unsaturated, which are utilized as diesel fuels, motor fuels, and lubricants, including instrument oils, turbine oils, motor oils, greases, emulsifiable oils, and the like. These products are often subject to severe operating conditions of temperature and pressure which tend to aggravate the oxidation reaction. Furthermore, oxidation of the product, either during storage or use, causes undesirable results with respect to the metal surfaces, such as the parts of an internal combustion engine in which the products are used. Corrosion and pitting of the metal surfaces occur as well as various other effects which hinder the efficient operation of the engine. A new class of oxidation inhibitors has been discovered which efficiently reduce the undesirable effects of the oxidation reaction and which are particularly effective in reducing corrosion of metal surfaces and in inhibiting the tendency of oil to produce an insoluble sludge. The inhibitors are also effective in other types of petroleum oil products such as fuel oils, in which they reduce the tendency of the oil to darken and to produce sludge.

The new class of oxidation inhibitors may be described as organic addition products formed by the reaction of an acyl halide or an aroyl halide with pyridine, quinoline, acridine, or their derivatives as hereinafter more explicitly defined. The acyl or aroyl halides generally react with the pyridine or similar compounds at room temperature and without the use of a catalyst and are employed in equimolar quantities.

The nitrogen-containing compounds which are employed in preparing the antioxidants of the present invention may be more exactly defined by the formulas—

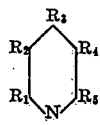 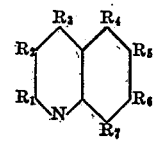

where $R_1 \ldots R_7$ represent hydrogen, hydrocarbon groups containing 1 to 20 carbon atoms, hydroxyl groups, sulfhydryl groups, alkoxy and mercaptide groups having alkyl radicals containing 1 to 20 carbon atoms, nitro groups or halogen atoms. The hydrocarbon groups may, for example, be alkyl, cycloalkyl, aryl, or terpenic groups, or combinations of such groups. It is preferable, although not necessary, that the groups adjacent to the nitrogen atom in the ring, when such groups are alkyl groups, have at least one hydrogen atom attached to the carbon atom which is adjacent to the nucleus. Examples of these compounds are pyridine, picolines, lutidines, ethylpyridines, collidine, methylethylpyridines, conyrine, parvoline, chloropyridines, dichloropyridine, pyridones, dihydroxypyridines, nitropyridines, methoxypyridines, quinoline, quinaldine, lepidine, dimethylquinolines, ethylquinolines, 1-hydroxyquinoline, carbostyril, chloroquinoline, nitroquinoline, methoxyquinoline, and the like.

The acyl or aroyl halide which is employed in accordance with the present invention to react with the above described nitrogen base compounds may be defined generically by the formula RCOX, where R represents a hydrocarbon radical, whether alkyl, alkenyl, aryl, alkaryl or aralkyl containing 1 to 30 carbon atoms, and X is a halogen. When R represents an alkyl group it preferably contains a chain of 1 to 20 carbon atoms; when it represents an alkenyl group it preferably contains from 3 to 20 carbon atoms; if an unsubstituted aryl group it preferably contains 6 to 10 carbon atoms (phenyl or naphthyl); and if alkyl side chains are present, these preferably contain from 1 to 20 carbon atoms each. Thus, the compound RCOX may be acetyl chloride, acetyl bromide, propionyl chloride, propionyl bromide, butyryl chloride, valeryl chloride, trimethylacetyl chloride, n-caproyl chloride, diethylacetyl chloride, dimethylethylacetyl chloride, stearyl chloride, oleyl chloride, benzoyl chloride, naphthyl chloride, toluyl chlorides, phenylacetyl chlorides, benzoyl bromide, benzoyl iodide, benzoyl fluoride, and the like.

The additive products formed by the reaction of an acid halide with a nitrogen base of the type described above may be illustrated by the general formula:

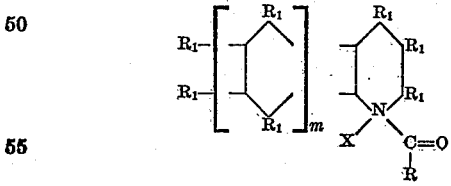

wherein the $R_1$ groups have the meanings defined above in connection with the $R_1$—$R_7$ groups, $m$ is 0 to 1, and R and X have the meanings defined above in connection with the formula RCOX.

Although the products produced by the method described above are quite effective as antioxidants in various products derived from petroleum, they are somewhat difficulty soluble in lubricating oil fractions, and in order to improve their solubility and increase the ease with which they may be incorporated in lubricating coils, it has been found advantageous to modify the product by replacing the halogen atom, introduced by means of the acid halide, with a group containing a hydrocarbon radical, such as a group—TR' where T represents oxygen or sulfur and R' is a hydrocarbon group, which may be an alkyl, alkaryl or aralkyl group containing 2 to 20 carbon atoms. This is accomplished by treating the reaction product prepared according to the method described above with an alkali metal alcoholate, mercaptide, phenolate, or thiophenolate. This reaction is also generally carried out at room temperature, although the temperature may range from about 20 to about 100° C. The amount of the metal alcoholate, mercaptide or the like which is employed is normally that which is theoretically equivalent to the halogen introduced into the first reaction product by means of the acid halide. It is possible to consider this product as having the constitution represented by the formula—

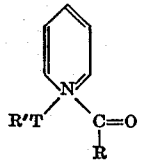

where R, R' and T have the meanings defined above.

The compounds of the type R'TM which may be employed in the modifying reaction are exemplified by the following: sodium methylate, sodium ethylate, potassium ethylate, sodium n-propylate, sodium isopropylate, sodium n-butylate, sodium tert.-butylate, sodium n-octylate, sodium cyclohexylate, sodium laurylate, sodium hexadecylate, sodium eicosylate, sodium ethyl mercaptide, sodium lauryl mercaptide, sodium phenylate, potassium phenylate, sodium naphthylate, the sodium salt of 1-hydroxy-4-phenylbutane, the sodium salt of 1-hydroxy-3-phenylhexane, sodium thiophenylate, and the like. The metallic compounds may be derived from commercial mixtures of alcohols as well as from pure alcohols. An example of a suitable mixture is "Lorol B" alcohol, a mixture of $C_{10}$ to $C_{18}$ primary alcohols derived from coconut oil.

The products prepared in accordance with the methods described above, whether containing a halogen atom or an alkoxy, mercaptide, or similar group in place of the halogen, may of course be employed in hydrocarbon oils without the presence of other antioxidants, but it has been found to be particularly advantageous to employ these products in combination with an antioxidant of the type of 2,6-di-tert.-butyl-4-methylphenol. This compound is a powerful antioxidant in itself, but in combination with the new additives of the present invention the antioxidant and corrosion preventing effects are even greater than would be expected from the known properties of the two additives when used separately.

The quantity of the additives of the present invention which may be most advantageously blended in mineral lubricating oils or other petroleum hydrocarbon products will depend upon the nature of the base oil to which they are added and upon the conditions to which the oil is to be subjected in use or in storage. Generally, the amount which may be advantageously employed will vary from about 0.05 to 2%, although quantities as great as 5% may on occasion be used.

In the following examples various preparations and tests of additives prepared in accordance with the present invention will be described in detail, but it is to be understood that these examples are illustrative only and should not be considered as limiting the scope of the invention in any way.

EXAMPLE 1

Equal molecular proportions of acetyl chloride and 2,6-lutidine were mixed at room temperature. After an hour the mixture was placed on a steam bath for two hours to complete the reaction. After cooling, the product was used without further purification.

EXAMPLE 2

Equal molecular proportions of acetyl chloride and 8-hydroxy-quinoline were mixed at room temperature and otherwise treated as in Example 1. A minor amount of solid material was precipitated which was removed by filtration and the remaining liquid product used without further purification.

EXAMPLE 3

Equal molecular proportions of acetyl chloride and quinoline were mixed and the mixture agitated at room temperature for about one hour, after which the mixture was placed on a steam bath for about two hours to complete the reaction. The product was purified by recrystallization from ethyl alcohol.

EXAMPLE 4

Equal molecular proportions of benzoyl chloride and quinoline were mixed and the reaction completed and the product purified as in Example 3.

EXAMPLE 5

103.5 g. (0.5 mol) of "Lorol B" alcohol and 27.0 g. (0.5 mol) of sodium methylate were heated in the presence of 200 ml. of xylene at refluxing temperature for 20 hours to produce the sodium salt of "Lorol B" alcohol (Product A). 70.4 g. (0.6 mol) of 2,6-lutidine and 70.2 g. (0.5 mol) of benzoyl chloride were mixed in the presence of 200 cc. of xylene and allowed to stand one hour at room temperature. This mixture (equivalent to 0.5 mol of addition product) was added to Product A over a period of one hour. Benzene was added to the mixture, which was filtered hot to remove the precipitated sodium chloride. The final product was crystallized out by refrigeration, filtered off and dried. 54 g. of product was obtained, representing a yield of 24%.

EXAMPLE 6

14.3 g. (0.1 mol) of quinaldine and 14.1 g. (0.1 mol) of benzoyl chloride were reacted in the presence of 50 g. of methyl ethyl ketone and allowed to stand overnight at room temperature. 34.3 g. (0.1 mol) of sodium lauryl mercaptide (72% in toluene) was added to the mixture and the whole was heated to the boiling point and filtered. The filtrate was cooled and white crystals recovered. The methyl ethyl ketone residue was extracted with ethyl alcohol and a second crop of crystals recovered. 17.6 g. of product, representing 38.3% yield, was obtained.

EXAMPLE 7—STAEGER OXIDATION TEST

Lubricating oils prepared by adding small quantities of the product prepared as described in Examples 1 to 6 to a turbine oil consisting of a solvent extracted Mid-Continent oil having a Saybolt viscosity of 43 seconds at 210° F., with and without the presence of 0.2% of 2,6-di-tert.-butyl-4-methyl phenol, and in every case with the further addition of 0.06% by weight of a zinc naphthenate corrosion inhibitor were tested in accordance with a modified Staeger oxidation test, which was conducted as follows:

The test employed was a modification of the Staeger test and consisted essentially of storing a 200 ml. sample of oil in a rotating shelf oven maintained at 110°±1° C. A 40 x 70 mm. freshly polished, copper strip was placed in the 400 ml. oil container to serve as an oxidation catalyst. The strip was removed every 72 hours and a clean strip substituted. During the test, the shelf rotated at an angular velocity of 4–6 R. P. M. and a positive ventilation of 1.5 to 2.0 cu. ft. of air per hour was maintained. Oil samples were periodically withdrawn from the container and the neutralization number was determined. The oxidation life of the sample is defined as the time in hours required to obtain an increase in neutralization number of 0.02 mg. KOH/g.

A sample of the base oil alone, without zinc naphthenate, showed a life of 65 hours, while the same with 0.06% zinc naphthenate showed a life of 30 hours. The results obtained in similar tests of samples of the base oil with 0.06 percent zinc naphthenate and 0.2 or 0.4 percent of the various products obtained in Examples 1 to 6, with and without the further addition of 0.2% of 2,6-di-tert.-butyl-4-methyl phenol, are shown in the following table:

*Table I*

| Antioxidant | Concentration (wt. %) | Staeger Oxidation Life (Hrs.) | |
|---|---|---|---|
| | | Base Oil Alone [1] | Base Oil [1] + 0.2% 2,6-di-tert.-butyl-4-methylphenol |
| None | 0.0 | 30 | 210 |
| 2,6-Di-tert.-butyl-4-methylphenol | 0.4 | 475 | |
| Acetyl chloride + 2,6-lutidine (Ex. 1) | 0.2 | | >834 |
| Acetyl chloride + 8-hydroxyquinoline (Example 2) | 0.4 | 75 | |
| Do | 0.2 | | 600 |
| Acetyl chloride + quinoline (Ex. 3) | 0.2 | | 425 |
| Benzoyl chloride + quinoline (Ex. 4) | 0.4 | 300 | |
| Do | 0.2 | | 400 |
| Benzoyl chloride + 2,6-lutidine + sodium salt of "Lorol B" alcohol (Example 5) | 0.4 | 205 | |
| Do | 0.2 | | 332 |

[1] Containing 0.06% by weight of zinc napthenate.

EXAMPLE 8.—S. O. D. BEARING CORROSION TEST

A sample of a well-refined solvent extracted paraffinic mineral lubricating oil of SAE 20 viscosity grade containing 0.25 percent by weight of the reaction product of benzoyl chloride, quinaldine, and sodium lauryl mercaptide (product of Example 6), and a sample of the unblended base oil were submitted to the S. O. D. bearing corrosion test which was conducted as follows: 500 cc. oil sample is maintained at 325° F. and aerated with 2 cu. ft. of air per hour. A steel shaft to which is affixed two one-quarter copper-lead bearings with total bearing area of 4.5 sq. in., rotates at 600 R. P. M. with the bearings immersed in the oil. The test is run for four hours and the loss of weight of the bearings determined. The bearings are repolished and reweighted and the test continued for additional four hour periods in like manner. The bearing corrosion life is the number of hours at which the cumulative weight loss becomes 100 mg., determined by interpolation of the data obtained in the various four-hour periods.

*Table II*

| Oil Composition | Bearing Corrosion Life (Hrs.) |
|---|---|
| Base oil alone | 9 |
| Base oil + 0.25% benzoyl chloride + quinaldine + sodium lauryl mercaptide (Example 6) | 23 |

EXAMPLE 9.—ENGINE DEPOSITION TEST

The effect of the inhibitor of the present invention in inhibiting sludge formation in internal combustion engines was determined by employing a lubricating oil containing the inhibitor as the crankcase lubricant in a Chevrolet engine, in a test known as the C. R. C. FL-2 low temperature engine test. This test was conducted with a solvent extracted Mid-Continent paraffinic oil of 46 seconds Saybolt viscosity at 210° F. and 100 V. I. to which had been added 0.8% of polybutene to give an oil of 125 V. I and 52 seconds viscosity at 210° F. as the crankcase lubricant. The gasoline employed was one of high deposit forming tendency containing untreated thermally and catalytically cracked stocks. Engine operating conditions approximated 50 M. P. H. at about road load for 40 hours or are equivalent to about 2000 miles of operation. The filtered oil (50 ml.) from this engine test was stored for two weeks in 250 ml. glass stoppered Erlenmeyer flasks at 190° F. with and without inhibitors of the present invention. After the two weeks' storage period, the sludge which had formed was removed by filtration and de-oiled by washing with heptane. The results, given as the amount of sludge remaining after the heptane washing, are shown in the following table.

*Table III*

| Additive | Heptane Insoluble Sludge (mg.) |
|---|---|
| None | 143 |
| Benzoyl chloride + pyridine [1] + sodium lauryl mercaptide | 79 |
| Benzoyl chloride + quinaldine + sodium lauryl mercaptide (Example 6) | 78 |

[1] A commercial product known as "20° mixed pyridines." The reactions were conducted in a manner similar to that of Example 6.

These results show that these two inhibitors were effective in markedly reducing the amount of sludge formed from reactive oil-soluble material present in the used lubricating oil. In the C. R. C. FL-2 engine test, the effects of fuel composition on engine deposit formation are accentuated by the relatively low jacket and crankcase oil temperatures of 95 and 165° F., respectively. Unburned and partially oxidized high boiling fuel fractions become dissolved in the lubricating oil where they further oxidize and polymerize to undesirable insoluble varnish and sludge deposits. Thus, although a motor lubricant may be satisfactorily stable under these engine operating conditions, the addition to the lubricant of the inhibitors described above will minimize engine deposits attributable to the fuel.

EXAMPLE 10.—FUEL OIL STABILIZATION TEST

The reaction product of benzoyl chloride, quinaldine, and sodium lauryl mercaptide (Example 6) was tested as a fuel oil inhibitor. In this test, 0.02 percent by weight of the additive was blended with 200 g. of a distillate hydrocarbon fuel made up of straight run and catalytically cracked petroleum fractions boiling in the range of 320° F. to 660° F. and placed in a 16 oz. clear glass bottle, which was stored for 10 days with partial exposure to sunlight. A similar sample of the fuel oil containing no inhibitor was stored in the same manner. After the ten day period the oil containing no additive had formed a large amount of sludge and had darkened considerably in color, while the sample containing the inhibitor contained only a very small amount of sludge and had darkened only slightly.

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, phosphites, thiophosphates, and thiophosphites, metal xanthates and thioxanthates, metal thiocarbamates, and the like. Other types of additives, such as phenols and phenol sulfides, may also be present.

The lubricating oil base stock used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may also be used. Also, for special applications, animal, vegetable or fish oils or their hydrogenated or volatilized products may be employed in admixtures with mineral oils.

For the best results the base stock chosen should normally be an oil which with the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, antioxidants, thickeners, viscosity index improvers, oiliness agents, resins, rubber, olefin polymers, and the like.

Assisting agents which are particularly desirable as plasticizers and defoamers are the higher alcohols having preferably 8–20 carbon atoms, e. g., octyl alcohol, lauryl alcohol, stearyl alcohol, and the like.

In addition to being employed in lubricants, the additives of the present invention may also be used in other mineral oil products such as motor fuels, fuel oils, hydraulic fluids, torque converter fluids, cutting oils, flushing oils, turbine oils, transformer oils, industrial oils, process oils, and the like, and generally as antioxidants in mineral oil products. They may also be used in gear lubricants, greases and other products containing mineral oils as ingredients.

What is claimed is:

1. A petroleum hydrocarbon product containing an oxidation inhibiting amount of a compound having the formula—

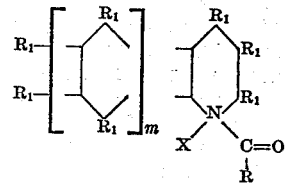

wherein the $R_1$ groups represent radicals of the class consisting of hydrogen, hydrocarbon groups containing 1 to 20 carbon atoms, hydroxyl groups, sulfhydryl groups, alkoxy and mercaptide groups with alkyl radicals containing 1 to 20 carbon atoms, nitro groups and halogen groups, $m$ is 0 to 1, R is a hydrocarbon radical containing 1 to 30 carbon atoms, and $x$ is a halogen.

2. A composition according to claim 1 in which the petroleum hydrocarbon product is a lubricating oil fraction.

3. A composition according to claim 1 in which all of the $R_1$ groups represent hydrogen.

4. A composition according to claim 1 in which R is an alkyl group of 1 to 20 carbon atoms.

5. A composition according to claim 1 in which R represents a methyl radical and X represents chlorine.

6. A composition according to claim 1 in which R represents a phenyl radical and X represents chlorine.

7. A composition according to claim 1 containing in addition an oxidation inhibiting amount of 2,6-di-tert.-butyl-4-methylphenol.

8. A petroleum hydrocarbon product containing an oxidation inhibiting amount of a compound having the formula

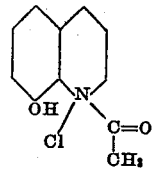

9. A petroleum hydrocarbon product containing an oxidation inhibiting amount of a compound having the formula

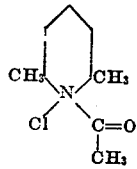

10. A petroleum hydrocarbon product containing an oxidation inhibiting amount of a compound having the formula

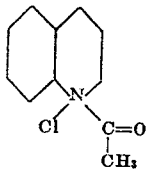

11. A petroleum hydrocarbon product containing an oxidation inhibiting amount of a compound having the formula

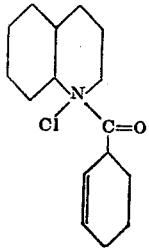

12. A composition according to claim 1 wherein X is replaced by the group —TR′, where T is a member of the group consisting of oxygen and sulfur and R′ is a hydrocarbon group containing 2 to 20 carbon atoms.

13. A composition according to claim 12 wherein the petroleum hydrocarbon product is a lubricating oil fraction.

14. A composition according to claim 12 wherein R′ is an alkyl radical.

15. A composition according to claim 12 containing in addition an oxidation inhibiting amount of 2,6-di-tert.-butyl-4-methylphenol.

16. A petroleum hydrocarbon product containing an oxidation inhibiting amount of a compound having the formula

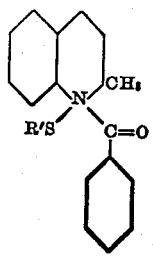

wherein R′ represents a lauryl group.

17. As a new composition of matter a compound having the general formula—

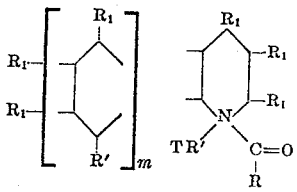

wherein the $R_1$ groups represent radicals of the class consisting of hydrogen, hydrocarbon groups containing 1 to 20 carbon atoms, hydroxyl groups, sulfhydryl groups, alkoxy and mercaptide groups with alkyl radicals containing 1 to 20 carbon atoms, nitro groups and halogen groups, $m$ is 0 to 1, R is a hydrocarbon radical containing 1 to 30 carbon atoms, T is a member of the group consisting of oxygen and sulfur, and R′ is a hydrocarbon group containing 2 to 20 carbon atoms.

18. A composition according to claim 17 in which all of the $R_1$ groups represent hydrogen.

19. A composition according to claim 17 in which R is an alkyl radical containing 1 to 20 carbon atoms.

20. A composition according to claim 17 wherein R′ is an alkyl radical.

21. As a new composition of matter a compound having the formula

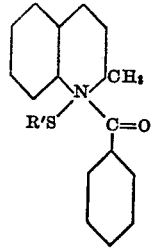

wherein R′ represents a lauryl group.

References Cited in the file of this patent

UNITED STATES PATENTS

| Number | Name | Date |
|---|---|---|
| 2,372,588 | Larsen | Mar. 27, 1945 |
| 2,537,428 | Seon et al. | Jan. 9, 1951 |

OTHER REFERENCES

Shriner et al.: "Identification of Organic Compounds," third edition, John Wiley, New York; 1948, page 87.

Vogt: Arch. Pharm., vol. 282, pp. 27–32 (1944).